United States Patent Office 2,877,242
Patented Mar. 10, 1959

2,877,242
METHOD OF PREPARING 11 BETA-HYDROXY TESTOSTERONE

Franz Sondheimer, Octavio Mancera and George Rosenkranz, Mexico City, Mexico, assignors to Syntex, S. A., Mexico City, Mexico, a corporation of Mexico No Drawing. Application April 9, 1954
Serial No. 422,241

Claims priority, application Mexico April 23, 1953

1 Claim. (Cl. 260—397.45)

The present invention relates to certain novel cyclopentanophenanthrene derivatives and to a method for the preparation thereof. More particularly the present invention relates to the novel androgenic hormones, 11β-hydroxy testosterone, esters thereof and novel esters of 11-keto testosterone.

In accordance with the present invention it has been discovered that compounds of the character just set forth may be readily prepared from adrenosterone (Δ⁴-androstene-3,11,17-trione) by reducing the adrenosterone with lithium aluminum hydride to prepare the corresponding triol, thereafter selectively oxidizing the triol with manganese dioxide at room temperature to prepare 11β-hydroxy testosterone and thereafter oxidizing a suitable ester of 11β-hydroxy testosterone with an oxidizing agent such as chromium trioxide to prepare the corresponding ester of 11-keto testosterone.

In accordance with the present invention therefore there is prepared novel androgenic compounds including novel esters of 11-keto testosterone, i. e. of Δ⁴-androstene-17β-ol-3,11-dione, and the novel 11β-hydroxy testosterone, i. e. Δ⁴-androstene-11β, 17β-diol-3-one as well as its novel 17-esters. The following equation illustrates the process of the present invention:

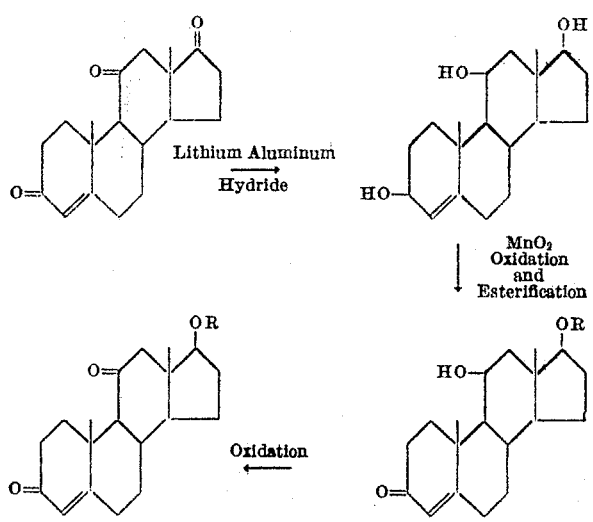

In the above equation R represents an acyl group, i. e. the acyl groups characteristic of esters of steroids. Thus R may represent a lower fatty acid acyl group or benzoic acid acyl group, as for example the residue of acetic or propionic acid or the residue of benzoic acid.

In practicing the present invention adrenosterone (Δ⁴-androstene-3,11,17-trione) is dissolved in an anhydrous organic solvent such as tetrahydrofurane and is added slowly to a solution of lithium aluminum hydride in a similar solvent. The mixture is then refluxed for a short period of time and the excess of hydride is decomposed as by the addition of ethyl acetate. Similarly, this reduction may be carried out by reaction with sodium boron hydride.

The product is a mixture of 3α and 3β isomers of Δ⁴-androstene-3,11β,17β-triol and it is desirable to oxidize this mixture directly with manganese dioxide rather than to purify the mixture to the 3β isomer. For this purpose the product is shaken with manganese dioxide for a long period of time, as for example 65 hours at room temperature. After purification 11β-hydroxy testosterone is produced. The 11β-hydroxy testosterone may be then acylated with an acylating agent, such as acetic anhydride or propionic anhydride in a solvent such as pyridine, to prepare the corresponding 17-monoacylate of 11β-hydroxy testosterone, since it may be noted that the 11β-hydroxy group is difficult to acylate. The 17-ester thus prepared may then be oxidized with an oxidizing agent such as chromium dioxide in aqueous acetic acid to oxidize the 11β-hydroxy group to the 11-keto group, and in this manner there is prepared the novel 17-esters of 11-keto testosterone. Conventional saponification of these esters produced 11-keto testosterone. The following specific examples serve to illustrate but are not intended to limit the present invention:

Example I

A solution of 350 mg. of adrenosterone in 30 cc. of anhydrous tetrahydrofurane was added dropwise to a solution of 300 mg. of lithium aluminum hydride in 20 cc. of tetrahydrofurane. The mixture was refluxed for 30 minutes and the excess of hydride was decomposed by the cautious addition of ethyl acetate. A saturated aqueous solution of sodium sulphate was then added, followed by 5 g. of solid sodium sulphate. The precipitated salts were filtered and washed with tetrahydrofurane. The filtrate was evaporated to dryness and the residue was dissolved in 35 cc. of dry chloroform. 3.5 g. of manganese dioxide was added to the solution and the mixture was shaken for 65 hr. at room temperature. The oxide was filtered and washed with hot chloroform. The filtrate was evaporated to dryness and the residue was purified by chromatography over aluminum oxide. The fractions eluted from the column with chloroform were combined and crystallized from acetonehexane, thus yielding 200 mg. of 11β-hydroxytestosterone having a melting point of 228–232° C. (analytical sample, M. P. 232–234° C.). Acetylation with acetic anhydride in pyridine at room temperature for 16 hr. afforded the 17-monoacetate of 11β-hydroxytestosterone having a melting point of 149–150° C.

Example II

A solution 100 mg. of the 17-monoacetate of 11β-hydroxytestosterone in glacial acetic acid was treated with a solution of 50 mg. of chromium trioxide in 1 cc. of 80% aqueous acetic acid, and the mixture was kept for 30 minutes at room temperature and then diluted with water. The precipitate was collected, washed and crystallized from acetone-hexane to give 91 mg. of the 17-acetate of 11-ketotestosterone having a melting point of 162–163° C.

The saponification of the above product was carried out by refluxing the substance for 30 minutes with potassium carbonate in aqueous methanol. Recrystallization from acetone-hexane afforded 11-ketotestosterone (Δ⁴-androsten-17β-ol-3,11-dione) having a melting point of 183–184° C.

We claim:

A methtod for the preparation of Δ⁴-androstene-11β, 17β-diol-3-one which comprises reducing Δ⁴-androstene-3,11,17-trione with lithium aluminum hydride to prepare a mixture of Δ⁴-androstene-3β,11β,17β-triol and Δ⁴-androstene-3α,11β,17β-triol and oxidizing said mixture with manganese dioxide.

References Cited in the file of this patent

UNITED STATES PATENTS

| | | |
|---|---|---|
| 2,602,769 | Murray et al. | July 8, 1952 |
| 2,666,016 | Hechter | Jan. 12, 1954 |
| 2,766,264 | Bernstein | Oct. 9, 1956 |
| 2,781,368 | Heyl | Feb. 12, 1957 |

OTHER REFERENCES

Herzog: Journal Am. Chem. Soc. 75, 266–269 (Jan. 20, 1953).